US010657743B2

(12) United States Patent
Wieth et al.

(10) Patent No.: US 10,657,743 B2
(45) Date of Patent: May 19, 2020

(54) METHOD FOR LOCKING AND UNLOCKING A RECEPTACLE FOR A MOBILE TELECOMMUNICATIONS TERMINAL DEVICE

(71) Applicants: Franz Wieth, Puchheim (DE); Andreas Filosi, Puchheim (DE)

(72) Inventors: Franz Wieth, Puchheim (DE); Andreas Filosi, Puchheim (DE)

( * ) Notice: Subject to any disclaimer, the term of this patent is extended or adjusted under 35 U.S.C. 154(b) by 0 days.

(21) Appl. No.: 16/473,141

(22) PCT Filed: Dec. 19, 2017

(86) PCT No.: PCT/EP2017/083560
§ 371 (c)(1),
(2) Date: Jun. 24, 2019

(87) PCT Pub. No.: WO2018/114959
PCT Pub. Date: Jun. 28, 2018

(65) Prior Publication Data
US 2019/0362573 A1 Nov. 28, 2019

(30) Foreign Application Priority Data
Dec. 23, 2016 (DE) .................. 10 2016 125 673

(51) Int. Cl.
*G07C 9/00* (2020.01)
*H04B 1/3888* (2015.01)
*H04M 1/04* (2006.01)

(52) U.S. Cl.
CPC ....... *G07C 9/00174* (2013.01); *H04B 1/3888* (2013.01); *H04M 1/04* (2013.01); *G07C 2009/00317* (2013.01); *H04M 2250/04* (2013.01)

(58) Field of Classification Search
CPC .. H04M 1/04; H04M 2250/04; H04M 1/0254; B62B 3/1424; G06F 1/1632; H04B 1/3877; H04B 1/3888; G06Q 30/06; G06Q 20/32; F16B 2/12; G07F 7/0618; G07F 7/0886; G07F 7/02; G07F 7/08; H04W 12/08; H04W 4/80; G07C 9/00174; G07C 2009/00317
See application file for complete search history.

(56) References Cited
U.S. PATENT DOCUMENTS

| | | | | |
|---|---|---|---|---|
| 8,152,062 B2 * | 4/2012 | Perrier | .................. | B62B 3/1416 235/383 |
| 8,202,114 B2 * | 6/2012 | Zilmer | .................... | H04M 1/04 439/529 |
| 8,336,774 B2 * | 12/2012 | Crum | .................. | G06Q 30/0207 235/380 |
| 8,672,199 B1 * | 3/2014 | Ditore | .................. | G06F 1/1632 224/411 |
| 8,816,816 B2 * | 8/2014 | Ciervo | .................. | G06F 1/1632 340/4.34 |
| 9,126,615 B2 * | 9/2015 | Mersky | .................. | B62B 3/1428 |
| 9,667,295 B2 * | 5/2017 | Wieth | .................... | G06Q 30/06 |
| 9,825,664 B2 * | 11/2017 | Wieth | .................. | G07G 1/0081 |
| 2004/0111320 A1 * | 6/2004 | Schlieffers | ............ | B62B 3/1424 705/16 |
| 2010/0072715 A1 * | 3/2010 | Crum | .................... | B62B 3/1408 280/33.992 |
| 2010/0264182 A1 * | 10/2010 | Perlman | .................. | H04M 1/04 224/409 |
| 2012/0119874 A1 * | 5/2012 | Ciervo | .................. | G06F 1/1632 340/4.34 |
| 2014/0069973 A1 * | 3/2014 | Peck | ...................... | B60R 11/02 224/411 |
| 2014/0339278 A1 * | 11/2014 | Ditore | ...................... | B62B 5/00 224/411 |
| 2014/0375456 A1 * | 12/2014 | Sonnendorfer | ........... | B62B 5/06 340/568.5 |
| 2015/0032559 A1 * | 1/2015 | Sonnendorfer | ..... | G06F 13/4081 705/21 |
| 2015/0318885 A1 * | 11/2015 | Earle | ...................... | H04B 1/385 455/575.6 |
| 2019/0362573 A1 * | 11/2019 | Wieth | .................... | H04M 1/04 |

FOREIGN PATENT DOCUMENTS

| | | | | |
|---|---|---|---|---|
| DE | 102013111478 A1 * | 4/2015 | ............. | G06Q 20/32 |
| EP | 3101879 A1 | 12/2016 | | |
| EP | 3101879 B1 * | 6/2018 | ............. | G06Q 30/06 |
| FR | 2975557 A1 | 11/2012 | | |
| WO | WO-2013153204 A1 * | 10/2013 | ......... | G06F 13/4081 |
| WO | 2015/055851 A1 | 4/2015 | | |
| WO | WO-2015055851 A1 * | 4/2015 | .......... | B62B 3/1428 |
| WO | 2017/144655 A1 | 8/2017 | | |
| WO | WO-2017144655 A1 * | 8/2017 | .......... | B62B 3/1428 |
| WO | WO-2018114959 A1 * | 6/2018 | ............. | H04M 1/04 |

* cited by examiner

*Primary Examiner* — Matthew C Sams
(74) *Attorney, Agent, or Firm* — Laurence A. Greenberg; Werner H. Stemer; Ralph E. Locher

(57) ABSTRACT

A method for locking and unlocking a receptacle for a mobile telecommunications terminal device, such as a smartphone. The receptacle is arranged in a holding device. A token is assigned to the holding device and secured against removal in an insertion opening. The token is released when a telecommunications terminal device is locked in the receptacle. When the token is inserted, an authorisation check is carried out for checking an assignment of the token. If the assignment is confirmed, the lock is unlocked. A signal is thereby generated when locking the telecommunications terminal device in the receptacle or upon successful authorization. The signal is transmitted to a blocking element that blocks the movement of a first control element. The signal activates the blocking element to end the block of the control element movement. There is also described a holding device for a mobile telecommunications terminal device.

12 Claims, No Drawings

METHOD FOR LOCKING AND UNLOCKING A RECEPTACLE FOR A MOBILE TELECOMMUNICATIONS TERMINAL DEVICE

BACKGROUND OF THE INVENTION

Field of the Invention

The application relates to a method for locking and unlocking a receptacle for a mobile telecommunications terminal device, in particular, a smartphone, wherein the receptacle is arranged in a holding device, wherein a token is assigned to the holding device, wherein the token, which is secured against being removed within an insertion opening of the holding device, is released if a telecommunications terminal device is locked within the receptacle, wherein the token is inserted into the holding device for unlocking the receptacle, wherein an authorisation check is carried out, by means of which the assignment of the token inserted into the holding device is checked and wherein the lock is unlocked if assignment of the token to the holding device has been established successfully. Furthermore, the application relates to a holding device, which is particularly suitable for carrying out the method.

From WO 2015/055851 A1, an embodiment of a generic holding device is known where the authorisation check for opening the receptacle takes place by means of a token. For this purpose, the respective token is assigned to a certain holding device. The token is inserted into the holding device and is removed from a base station together with it, in which the holding devices are provided. For example, the authorisation check in the holding device can take place concerning a certain geometry that the authorised token must have. Alternatively, the token can comprise a transponder, via which an electronic authorisation check takes place in the holding device.

The object of the application is to propose a method, which functions in a reliable manner, for locking and unlocking the receptacle of a generic holding device and for the authorisation check running within it. Furthermore, its object is to propose a holding device and a token, which are particularly suitable for carrying out the method according to the invention. Thereby, the invention falls back on the features of the holding device described in WO 2015/055851 A1 and adopts these itself.

SUMMARY OF THE INVENTION

The tasks are achieved by means of the method as claimed and the holding device as claimed. Several particularly preferred embodiments shall be mentioned in the respective dependent claims.

A basic idea of the invention entails designing the method for locking and unlocking a receptacle for a mobile telecommunications terminal device in such a way that the receptacle is arranged in a holding device, a token is assigned to the holding device, that the token, which is secured against being removed within an insertion opening of the holding device, is released if a telecommunications terminal device is locked within the receptacle. The token is inserted into the holding device for unlocking the receptacle, wherein an authorisation check is carried out, by means of which the assignment of the token inserted into the holding device is checked. Upon the assignment of the token to the holding device being successfully established, the lock is unlocked, wherein a signal is generated when locking the telecommunications terminal device in the receptacle or upon successfully carrying out the authorisation check, said signal being transmitted to a blocking element that blocks the movement of a first control element, wherein the signal activates the blocking element, wherein the activation of the blocking element ends the block of the control element's movement.

Another basic idea of the invention entails designing the holding device for a mobile telecommunications terminal device in such a way that it comprises a receptacle for the mobile communications terminal device, wherein the holding device comprises an attachment mechanism, by means of which the mobile telecommunications terminal device can be locked within the receptacle, wherein the holding device comprises a token, which is held in an insertion opening in a detachable manner, wherein a holding element firmly holds the token in the insertion opening if the receptacle is unlocked and wherein the holding element is arranged on a swivel-mounted first control element.

The particular advantages of the method according to the invention and the holding device according to the invention, as well as their preferred embodiments and their respective advantages are shown in the following based on a description of the method. Thereby, in initially, a preferred method sequence is explained in the case of the holding device's proper function.

In the initial situation now described, the token is held in the insertion opening of the holding device by the first control element, which will be described in the following in the preferred embodiment of a control disc, and the telescopic bracket of the receptacle is retracted within the holding device.

At a first step, the mobile telecommunications terminal device, referred to in the following as a smartphone, is set onto a connection, for example a USB connection, provided for the smartphone within the holding device. Thereby, it can be set onto the bracket or furthermore remain in the hand of the user. At a further step, the bracket of the receptacle is pulled out. Now, the smartphone can be inserted into the bracket by the customer or it slides into this on its own as soon as the bracket releases an opening that is sufficiently large enough for the smartphone.

At a following step, the bracket is closed and thereby, the smartphone pushes against a switch in the upper bar of the bracket, whereby a signal is triggered, thereby closing a circuit in particular. By means of the signal, the blocking element is activated, wherein the activation of the blocking element ends an existing blocking of the control element's movement.

Preferably, the blocking element is a spring-loaded tappet, which is moved against the spring load by an electromagnet when it is activated. The tappet can impinge into the rotary disc in the deactivated state of the blocking element. Alternatively, in the deactivated state, it can block an extension of the protruding at the rotary disc, for example, a cam arranged on the control disc, the route of which is released by the tappet upon activation of the electromagnet. The invention provides that the blocking element must be activated in order to release the block. The remaining time can thereby remain in the deactivated and, therefore, energy-saving state.

If the blocking element is activated, a sliding switch of the holding device connected to the control disc can be moved from the position "open" to the position "locked" by the customer. Preferably, this occurs via a nib on the sliding switch, which is guided within a groove or a connecting link of the control disc. By means of the movement of the sliding switch, the control disc is rotated and cam slides by the tappet.

Due to the rotational movement of the control disc, the following is brought about: A rotary spring forms a spring-loaded connecting link or groove for a nib of the rotary disc. The rotary spring and the control disc are in a first end position before the rotational movement begins, in which the control disc holds the token and the rotary spring does not lock the bracket. The groove and the nib are aligned with each other in a toggle-lever-like manner. On the one hand, this causes the rotary spring and the control disc to rotate in an opposing manner.

A spring load of the nib in the connecting link or the groove leads to this load having to be overcome upon the start of rotation. Once the dead point of the toggle lever has been exceeded, the spring supports the further movement of the control disc and the rotary spring into the respective end position. This ensures that the movement of the control disc and the rotary spring is continued even without the customer's involvement after exceeding the dead point up to the second end positions or that it is returned to the first end position before it has been exceeded. Accidental assumption of a position in between can therefore be prevented.

In the second end position of the rotary spring, the bracket is locked using an attachment mechanism. This is preferably done by closing a toothing system, so that the bracket can no longer be moved. The smartphone is then reliably held in the receptacle. The different sizes of a smartphone require an angle compensation in the toothing system, preferably on the toothing system, which is connected to the rotary spring. Such angle compensation can be shaped by the formation of a slight hysteresis.

During the movement of the control disc from the first end position into the second end position, another nib of the control disc releases the previously blocked token. During the further course of the rotation, the control disc slides along the contour of the token so that this is pressed out of the insertion opening according to the gradient of the contour. The token comes towards the customer, so to speak, and can be easily grabbed and removed.

A control system located in the holding device deactivates the electromagnet so that, in the preferred exemplary embodiment, it is no longer possible to put cam of the control disc back. The deactivation takes place either via a limit switch, which detects the completed rotational movement of the control disc, or via an interval timer, for example, by deactivation taking place after three seconds. This has the advantage that, even in the case of not reaching the second end position, the blocking element is deactivated again.

The removal of the smartphone preferably takes place as described in the following: When inserting the token, an authorisation check is carried out. Preferably, a transponder attached to the token is checked for the assignment to the holding device and in the case of positive assignment, the control system is activated. The token is therefore preferably a passive token that contains an RFID chip in particular. It is particularly advantageous if the detection of the RFID chip is triggered by a switch, which is operated when inserting the token into the insertion opening.

If the authorisation check is negative, the control disc remains blocked. If the assignment of the token to the holding device is positive however, the blocking element is activated. By means, the control disc can be rotated. A limit switch detects the insertion of the token and activates the blocking element so that the control disc can now be rotated. By moving the sliding switch from blocked to open, the control disc is rotated so that the receptacle of the rotary disc releases the insertion opening again and the token can slide deeper into the opening.

Preferably, the token is pulled in by moving the control disc into the opening. For this purpose, a nib of the control disc impinges behind an edge of the token. This nib can also be used to secure the token in the insertion opening against being removed.

It is also advantageous if the receptacle of the control disc for the token prevents the token from being fully pushed in as long as the control disc is positioned in the second end position. In this preferred embodiment, the token can only be inserted deeper into the opening following the positive authorisation check since the blocking element is now activated, and the control disc can be moved. For this purpose, an edge of the token glides along a receptacle of the control disc and rotates it from the second end position back to the first end position. Thereby, the gradient of the edge determines the speed of the rotational movement. By rotating the control disc, the sliding switch connected to it is moved into the open position.

Moving the control disc into the first end position causes a corresponding movement of the rotary spring, as has already been described above. By means of this, the toothing system blocking the bracket, the bracket is unlocked and can be pulled out. Now it is possible to remove the smartphone. The blocking element is either deactivated again by means of detecting a rotation of the control disc into the first end position having taken place by means of a limit switch and/or via an interval timer. By means of this, the control disc is blocked, whereby a removal of the token is prevented.

If the control system should fail or the energy store of the holding device should be empty, the blocking element can no longer be activated. In this state, if a smartphone is locked in the receptacle, the bracket can no longer be unlocked and therefore, the smartphone can no longer be removed from the receptacle of the holding device. For this case, the invention proposes the use of a master token, by means of which a movement of the blocking element can take place without its activation. The master token comprises an adjustment element, which is moveably mounted to the master token. It is aligned in such a way that it can interact with the blocking element.

For this purpose, the adjustment element can be rotated, adjusted or displaced relative to the master token depending on the design.

The movement relative to the master token is used to mechanically move the blocking element by means of the adjustment element into the position, in which it would be during activation. In the exemplary embodiment of the blocking element in the form of a spring-loaded tappet that is to be moved by means of an electric magnet, this is preferably achieved by the adjustment element being guided against the tappet by rotating it and upon continuing rotation, the tappet is pressed out of the blocked position into the activated position.

As a result, the movement of the control disc is no longer blocked by the tappet so that the sliding switch can now be set from blocked to open. According to the above, the associated rotation of the control disc leads to a rotation of the rotary spring, which in turn unlocks the block of the bracket of the receptacle. This allows the smartphone to be removed.

In the event that the stored assignment of a particular token to a holding device has been deleted, for example, due to an exchanging of the energy store, it is advantageous if the master token comprises a transponder, which is assigned to all holding devices belonging to the business establishment.

It is also advantageous if a battery exchange or an exchange of the control system causes the next inserted and correctly read token to be accepted as an authorised token for this holding device.

The invention claimed is:

1. A method for locking and unlocking a receptacle for a mobile telecommunications terminal device, wherein the receptacle is disposed in a holding device, a token is assigned to the holding device, and wherein the token is secured against being removed within an insertion opening of the holding device and the token is released when the telecommunications terminal device is locked within the receptacle, the method comprising:
   wherein, when the token is inserted into the holding device for unlocking the receptacle, carrying out an authorization check for checking an assignment of the token inserted into the holding device and, if the assignment of the token to the holding device has been established successfully, unlocking the lock;
   generating a signal when locking the telecommunications terminal device in the receptacle or upon successfully carrying out the authorization check; and
   transmitting the signal to a blocking element that is disposed to block the movement of a first control element, the signal activating the blocking element to cause the blocking element to end the block of the movement of the control element.

2. The method according to claim 1, wherein the mobile telecommunications terminal device is a smartphone.

3. The method according to claim 1, which comprises deactivating the blocking element after the first control element has been moved into a certain position or after a specified time has elapsed since releasing the block.

4. The method according to claim 1, wherein the blocking element is a spring-loaded tappet, and moving the tappet against the spring load by an electromagnet by way of activating the blocking element.

5. The method according to claim 1, wherein a master token inserted into the insertion opening has access to the blocking element so that the master token can move the blocking element from its blocked position into the release position without activating the blocking element.

6. The method according to claim 1, wherein the token is secured in the holding device against removal when the successful assignment of the token to the holding device has been established.

7. A holding device for a mobile telecommunications terminal device, the holding device comprising:
   a receptacle for the mobile communications terminal device;
   an attachment mechanism for locking the mobile telecommunications terminal device within said receptacle;
   a token to be removably held in an insertion opening;
   a holding element configured to firmly hold the token in the insertion opening when said receptacle is unlocked and to release the token from said holding element when said receptacle is locked; and
   wherein said holding element is mounted on a swivel-mounted first control element.

8. The holding device according to claim 7, configured for carrying out the method according to claim 1.

9. The holding device according to claim 7, which comprises a blocking element disposed to block a rotational movement of said first control element.

10. The holding device according to claim 7, further comprising a control system configured to carry out an authorization check on the token.

11. The holding device according to claim 7, wherein said swivel-mounted first control element is connected to a second control element, and said second control element is configured to cause said receptacle to be selectively locked or unlocked depending on a current position thereof.

12. The holding device according to claim 11, wherein said first control element and said second control element comprise a toggle-lever connection.

* * * * *